US010685004B2

(12) United States Patent
Xiu et al.

(10) Patent No.: US 10,685,004 B2
(45) Date of Patent: Jun. 16, 2020

(54) MULTIPLE FEATURE HASH MAP TO ENABLE FEATURE SELECTION AND EFFICIENT MEMORY USAGE

(71) Applicant: salesforce.com, inc., San Francisco, CA (US)

(72) Inventors: Pingping Xiu, Santa Clara, CA (US); Scott Douglas White, Seattle, WA (US); Parijat Mazumdar, Champaign, IL (US)

(73) Assignee: SALESFORCE.COM, INC., San Francisco, CA (US)

( * ) Notice: Subject to any disclaimer, the term of this patent is extended or adjusted under 35 U.S.C. 154(b) by 996 days.

(21) Appl. No.: 15/207,153

(22) Filed: Jul. 11, 2016

(65) Prior Publication Data

US 2018/0011851 A1    Jan. 11, 2018

(51) Int. Cl.
*G06F 16/22* (2019.01)
*G06N 20/00* (2019.01)

(52) U.S. Cl.
CPC ......... *G06F 16/2255* (2019.01); *G06N 20/00* (2019.01)

(58) Field of Classification Search
CPC ............................ G06F 16/2255; G06N 20/00
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 5,983,227 A | 11/1999 | Nazem et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,133 B1 | 4/2001 | Masthoff |
| 6,216,135 B1 | 4/2001 | Brodersen et al. |

(Continued)

OTHER PUBLICATIONS

Weinberger et al., "Feature Hashing for Large Scale Multitask Learning", Feb. 27, 2010, ICML 2009, pp. 1-10 (Year: 2010).*

(Continued)

*Primary Examiner* — Kamran Afshar
*Assistant Examiner* — Brent Johnston Hoover
(74) *Attorney, Agent, or Firm* — Schwabe Williamson & Wyatt

(57) ABSTRACT

Disclosed embodiments are related to feature hashing techniques. A processing device of a database system may identify a set of machine learning features; generate a first hash map of said set of machine learning features and a second different hash map of said set of machine learning features. The processing device may generate a memory compact model for an online machine learning system using the first and second hash maps, and store the memory compact model in the memory device.

19 Claims, 5 Drawing Sheets

(56) References Cited

U.S. PATENT DOCUMENTS

| | | |
|---|---|---|
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshaysky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,069,231 B1 | 6/2006 | Cinarkaya |
| 7,069,497 B1 | 6/2006 | Desai |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,743,003 B1 * | 6/2010 | Tong .................... G06N 20/00 706/12 |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,853,881 B1 | 12/2010 | Aly Assal et al. |
| 7,945,653 B2 | 5/2011 | Zukerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2008/0249972 A1 | 10/2008 | Dillon |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2009/0204591 A1 * | 8/2009 | Kaksonen .......... G06F 11/3684 |
| 2011/0218958 A1 | 9/2011 | Warshaysky |
| 2011/0247051 A1 | 10/2011 | Bulumulla |

(56) References Cited

U.S. PATENT DOCUMENTS

| | | | |
|---|---|---|---|
| 2012/0011108 A1* | 1/2012 | Bensberg | G06F 16/24544 |
| | | | 707/714 |
| 2012/0042218 A1 | 2/2012 | Cinarkaya | |
| 2012/0233137 A1 | 9/2012 | Jakobson et al. | |
| 2012/0290407 A1 | 11/2012 | Hubbard et al. | |
| 2013/0212497 A1 | 8/2013 | Zelenko et al. | |
| 2013/0218948 A1 | 8/2013 | Jakobson | |
| 2013/0218949 A1 | 8/2013 | Jakobson | |
| 2013/0218966 A1 | 8/2013 | Jakobson | |
| 2013/0247216 A1 | 9/2013 | Cinarkaya | |
| 2014/0359537 A1 | 12/2014 | Jackobson et al. | |
| 2016/0078361 A1* | 3/2016 | Brueckner | H04L 67/10 |
| | | | 706/12 |
| 2016/0358043 A1* | 12/2016 | Mu | G06F 16/51 |
| 2016/0362211 A1* | 12/2016 | Kruglick | B65B 57/02 |

OTHER PUBLICATIONS

Attenberg, et al., Collaborative Spam Filtering with the Hashing Trick; Virus Bulletin, Nov. 1, 2009, https://www.virusbulletin.com/virusbulletin/2009/11/collaborative-spam-filtering-hashing-trick.

Wikipedia, At least as early as Jul. 4, 2016, https://en.wikipedia.org/wiki/Feature_hashing.

Wikipedia, At least as early as Jul. 4, 2016, https://en.wikipedia.org/wiki/Bloom_filter.

Cheng, Wide & Deep Learning: Better Together with TensorFlow; Google Research Blog, Jun. 29, 2016, https://research.googleblog.com/2016/06/wide-deep-learning-better-together-with.html.

Langford, Vowpal Wabbit Uses Hashing and Feature Names, Feb. 13, 2015, https://github.com/JohnLangford/vowpal_wabbit/wiki/Feature-Hashing-and-Extraction.

\* cited by examiner

MULTIPLE FEATURE HASH MAP TO ENABLE FEATURE SELECTION AND EFFICIENT MEMORY USAGE

COPYRIGHT NOTICE

A portion of the disclosure of this patent document contains material which is subject to copyright protection. The copyright owner has no objection to the facsimile reproduction by anyone of the patent document or the patent disclosure, as it appears in the United States Patent and Trademark Office patent file or records, but otherwise reserves all copyright rights whatsoever.

TECHNICAL FIELD

One or more implementations relate generally to machine learning, and some embodiments related to using a multiple feature hash map to enable feature selection and efficient memory usage.

BACKGROUND

In machine learning, one important problem is how to represent an example using a set of properties (e.g., features, which are also referred to as machine learning features) so that it captures the nature of the example. In spam detection, the example is the document, and the classes to characterize the example are "spam", "non-spam", and we want to get good features that can differentiate spams or non-spams with good accuracies.

A typical approach represents a document using its constituent terms as "bag-of-words" features. A modern machine learning toolbox such as Vowpal Wabbit receives the features and the pre-determined classes of the examples as input, and produces a classifier so that given new document, it can classify it as either spam or non-spam.

It is intuitive that by looking at "bag-of-words" for a given document, a human can easily identify smoking guns of spams such as sexual words, advertising terms, or the like, which helps to judge spam. However, a machine will just take the "bag-of-words" features as a set of independent facts, and use a mathematical equation such as linear combination or artificial neural networks (we call it "model" in machine learning) to summarize them into a single confidence score on being spam, with typical scores ranging from 0 (least confident) to 1 (most confident).

Among features, some are relevant to spam detection, others are not. These other features, sometimes referred to as "irrelevant features", will make model less accurate. A desirable quality is for a model to be robust so that the presence of irrelevant features will not impact the output score, which in practice is very challenging, because a majority of features will be irrelevant features to the problem. In practice a user identifies irrelevant features through training on very large ground-truth dataset, and filter features by the criteria of sensitivity to the models; or by manually cherry picking relevant features based on experiences because bag of words model is interpretable.

Another issue on developing a practical machine learning component is that, the size of bag-of-words model can grow unlimited: each word will have a unique entry in the model storing its parameters, and there may be at least tens of thousands of words if the relevant language is the English language. After including bi-gram features (a feature set which considers a pair of neighboring words as a virtual word to capture context information), the model size grows even larger, sometimes unrealistic for online serving where memory resource is tight.

BRIEF DESCRIPTION OF THE DRAWINGS

The included drawings are for illustrative purposes and serve to provide examples of possible structures and operations for the disclosed inventive systems, apparatus, methods and computer-readable storage media. These drawings in no way limit any changes in form and detail that may be made by one skilled in the art without departing from the spirit and scope of the disclosed implementations.

DETAILED DESCRIPTION

Examples of systems, apparatus, computer-readable storage media, and methods according to the disclosed implementations are described in this section. These examples are being provided solely to add context and aid in the understanding of the disclosed implementations. It will thus be apparent to one skilled in the art that the disclosed implementations may be practiced without some or all of the specific details provided. In other instances, certain process or method operations, also referred to herein as "blocks," have not been described in detail in order to avoid unnecessarily obscuring the disclosed implementations. Other implementations and applications also are possible, and as such, the following examples should not be taken as definitive or limiting either in scope or setting.

In the following detailed description, references are made to the accompanying drawings, which form a part of the description and in which are shown, by way of illustration, specific implementations. Although these disclosed implementations are described in sufficient detail to enable one skilled in the art to practice the implementations, it is to be understood that these examples are not limiting, such that other implementations may be used and changes may be made to the disclosed implementations without departing from their spirit and scope. For example, the blocks of the methods shown and described herein are not necessarily performed in the order indicated in some other implementations. Additionally, in some other implementations, the disclosed methods may include more or fewer blocks than are described. As another example, some blocks described herein as separate blocks may be combined in some other implementations. Conversely, what may be described herein as a single block may be implemented in multiple blocks in some other implementations. Additionally, the conjunction "or" is intended herein in the inclusive sense where appropriate unless otherwise indicated; that is, the phrase "A, B or C" is intended to include the possibilities of "A," "B," "C," "A and B," "B and C," "A and C" and "A, B and C."

Some implementations described and referenced herein are directed to systems, apparatus, computer-implemented methods and computer-readable storage media for multiple feature hash map to enable feature selection and efficient memory usage.

In an example, a processing device of a database system may identify a set of machine learning features; generate a first hash map of said set of machine learning features and a second different hash map of said set of machine learning features. The processing device may generate a memory compact model for an online machine learning system using the first and second hash maps, and store the memory compact model in the memory device.

I. Example System Overview

Figure 1A:
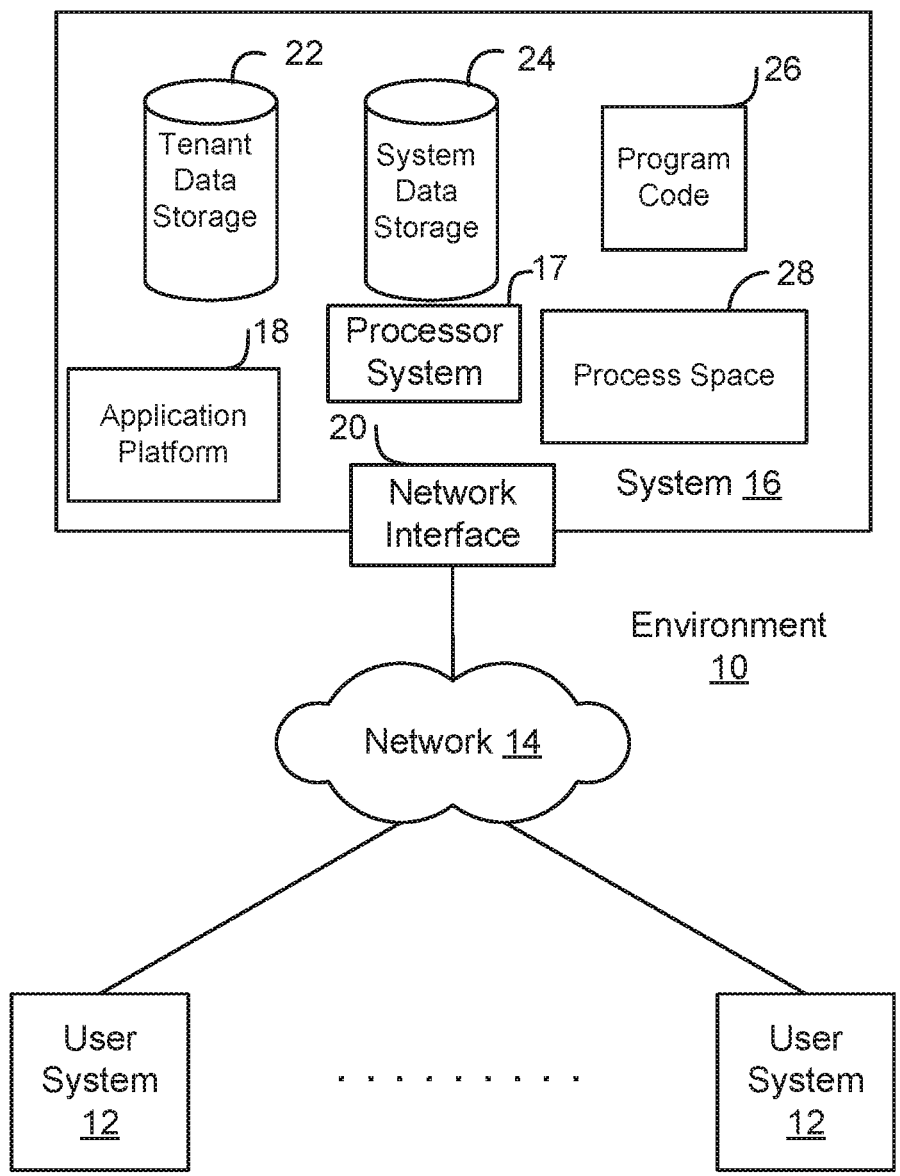
FIG. 1A shows a block diagram of an example environment in which an on-demand database service can be used according to some implementations.

FIG. 1A shows a block diagram of an example of an environment 10 in which an on-demand database service can be used in accordance with some implementations. The environment 10 includes user systems 12, a network 14, a database system 16 (also referred to herein as a "cloud-based system"), a processor system 17, an application platform 18, a network interface 20, tenant database 22 for storing tenant data 23, system database 24 for storing system data 25, program code 26 for implementing various functions of the system 16, and process space 28 for executing database system processes and tenant-specific processes, such as running applications as part of an application hosting service. In some other implementations, environment 10 may not have all of these components or systems, or may have other components or systems instead of, or in addition to, those listed above.

In some implementations, the environment 10 is an environment in which an on-demand database service exists. An on-demand database service, such as that which can be implemented using the system 16, is a service that is made available to users outside of the enterprise(s) that own, maintain or provide access to the system 16. As described above, such users generally do not need to be concerned with building or maintaining the system 16. Instead, resources provided by the system 16 may be available for such users' use when the users need services provided by the system 16; that is, on the demand of the users. Some on-demand database services can store information from one or more tenants into tables of a common database image to form a multi-tenant database system (MTS). The term "multi-tenant database system" can refer to those systems in which various elements of hardware and software of a database system may be shared by one or more customers or tenants. For example, a given application server may simultaneously process requests for a great number of customers, and a given database table may store rows of data such as feed items for a potentially much greater number of customers. A database image can include one or more database objects. A relational database management system (RDBMS) or the equivalent can execute storage and retrieval of information against the database object(s).

Application platform 18 can be a framework that allows the applications of system 16 to execute, such as the hardware or software infrastructure of the system 16. In some implementations, the application platform 18 enables the creation, management and execution of one or more applications developed by the provider of the on-demand database service, users accessing the on-demand database service via user systems 12, or third party application developers accessing the on-demand database service via user systems 12.

In some implementations, the system 16 implements a web-based customer relationship management (CRM) system. For example, in some such implementations, the system 16 includes application servers configured to implement and execute CRM software applications as well as provide related data, code, forms, renderable web pages and documents and other information to and from user systems 12 and to store to, and retrieve from, a database system related data, objects, and Web page content. In some MTS implementations, data for multiple tenants may be stored in the same physical database object in tenant database 22. In some such implementations, tenant data is arranged in the storage medium(s) of tenant database 22 so that data of one tenant is kept logically separate from that of other tenants so that one tenant does not have access to another tenant's data, unless such data is expressly shared. The system 16 also implements applications other than, or in addition to, a CRM application. For example, the system 16 can provide tenant access to multiple hosted (standard and custom) applications, including a CRM application. User (or third party developer) applications, which may or may not include CRM, may be supported by the application platform 18. The application platform 18 manages the creation and storage of the applications into one or more database objects and the execution of the applications in one or more virtual machines in the process space of the system 16.

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (for example, in a server farm located in a single building or campus), or they may be distributed at locations remote from one another (for example, one or more servers located in city A and one or more servers located in city B). As used herein, each MTS could include one or more logically or physically connected servers distributed locally or across one or more geographic locations. Additionally, the term "server" is meant to refer to a computing device or system, including processing hardware and process space(s), an associated storage medium such as a memory device or database, and, in some instances, a database application (for example, OODBMS or RDBMS) as is well known in the art. It should also be understood that "server system" and "server" are often used interchangeably herein. Similarly, the database objects described herein can be implemented as part of a single database, a distributed database, a collection of distributed databases, a database with redundant online or offline backups or other redundancies, etc., and can include a distributed database or storage network and associated processing intelligence.

The network 14 can be or include any network or combination of networks of systems or devices that communicate with one another. For example, the network 14 can be or include any one or any combination of a LAN (local area network), WAN (wide area network), telephone network, wireless network, cellular network, point-to-point network, star network, token ring network, hub network, or other appropriate configuration. The network 14 can include a TCP/IP (Transfer Control Protocol and Internet Protocol) network, such as the global internetwork of networks often referred to as the "Internet" (with a capital "I"). The Internet will be used in many of the examples herein. However, it should be understood that the networks that the disclosed implementations can use are not so limited, although TCP/IP is a frequently implemented protocol.

The user systems 12 can communicate with system 16 using TCP/IP and, at a higher network level, other common Internet protocols to communicate, such as HTTP, FTP, AFS, WAP, etc. In an example where HTTP is used, each user system 12 can include an HTTP client commonly referred to as a "web browser" or simply a "browser" for sending and receiving HTTP signals to and from an HTTP server of the system 16. Such an HTTP server can be implemented as the sole network interface 20 between the system 16 and the network 14, but other techniques can be used in addition to or instead of these techniques. In some implementations, the network interface 20 between the system 16 and the network 14 includes load sharing functionality, such as round-robin HTTP request distributors to balance loads and distribute incoming HTTP requests evenly over a number of servers. In MIS implementations, each of the servers can have access to the MTS data; however, other alternative configurations may be used instead.

The user systems 12 can be implemented as any computing device(s) or other data processing apparatus or systems usable by users to access the database system 16. For example, any of user systems 12 can be a desktop computer, a work station, a laptop computer, a tablet computer, a handheld computing device, a mobile cellular phone (for example, a "smartphone"), or any other Wi-Fi-enabled device, wireless access protocol (WAP)-enabled device, or other computing device capable of interfacing directly or indirectly to the Internet or other network. The terms "user system" and "computing device" are used interchangeably herein with one another and with the term "computer." As described above, each user system 12 typically executes an HTTP client, for example, a web browsing (or simply "browsing") program, such as a web browser based on the WebKit platform, Microsoft's Internet Explorer browser, Apple's Safari, Google's Chrome, Opera's browser, or Mozilla's Firefox browser, or the like, allowing a user (for example, a subscriber of on-demand services provided by the system 16) of the user system 12 to access, process and view information, pages and applications available to it from the system 16 over the network 14.

Each user system 12 also typically includes one or more user input devices, such as a keyboard, a mouse, a trackball, a touch pad, a touch screen, a pen or stylus or the like, for interacting with a graphical user interface (GUI) provided by the browser on a display (for example, a monitor screen, liquid crystal display (LCD), light-emitting diode (LED) display, among other possibilities) of the user system 12 in conjunction with pages, forms, applications and other information provided by the system 16 or other systems or servers. For example, the user interface device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

The users of user systems 12 may differ in their respective capacities, and the capacity of a particular user system 12 can be entirely determined by permissions (permission levels) for the current user of such user system. For example, where a salesperson is using a particular user system 12 to interact with the system 16, that user system can have the capacities allotted to the salesperson. However, while an administrator is using that user system 12 to interact with the system 16, that user system can have the capacities allotted to that administrator. Where a hierarchical role model is used, users at one permission level can have access to applications, data, and database information accessible by a lower permission level user, but may not have access to certain applications, database information, and data accessible by a user at a higher permission level. Thus, different users generally will have different capabilities with regard to accessing and modifying application and database information, depending on the users' respective security or permission levels (also referred to as "authorizations").

According to some implementations, each user system 12 and some or all of its components are operator-configurable using applications, such as a browser, including computer code executed using a central processing unit (CPU) such as an Intel Pentium® processor or the like. Similarly, the system 16 (and additional instances of an MTS, where more than one is present) and all of its components can be operator-configurable using application(s) including computer code to run using the processor system 17, which may be implemented to include a CPU, which may include an Intel Pentium® processor or the like, or multiple CPUs.

The system 16 includes tangible computer-readable media having non-transitory instructions stored thereon/in that are executable by or used to program a server or other computing system (or collection of such servers or computing systems) to perform some of the implementation of processes described herein. For example, computer program code 26 can implement instructions for operating and configuring the system 16 to intercommunicate and to process web pages, applications and other data and media content as described herein. In some implementations, the computer code 26 can be downloadable and stored on a hard disk, but the entire program code, or portions thereof, also can be stored in any other volatile or non-volatile memory medium or device as is well known, such as a ROM or RAM, or provided on any media capable of storing program code, such as any type of rotating media including floppy disks, optical discs, digital versatile disks (DVD), compact disks (CD), microdrives, and magneto-optical disks, and magnetic or optical cards, nanosystems (including molecular memory ICs), or any other type of computer-readable medium or device suitable for storing instructions or data. Additionally, the entire program code, or portions thereof, may be transmitted and downloaded from a software source over a transmission medium, for example, over the Internet, or from another server, as is well known, or transmitted over any other existing network connection as is well known for example, extranet, VPN, LAN, etc.) using any communication medium and protocols (for example, TCP/IP, HTTP, HTTPS, Ethernet, etc.) as are well known. It will also be appreciated that computer code for the disclosed implementations can be realized in any programming language that can be executed on a server or other computing system such as, for example, C, C++, HTML, any other markup language, Java™, JavaScript, ActiveX, any other scripting language, such as VBScript, and many other programming languages as are well brown may be used. (Java™ is a trademark of Sun Microsystems, Inc.).

Figure 1B:
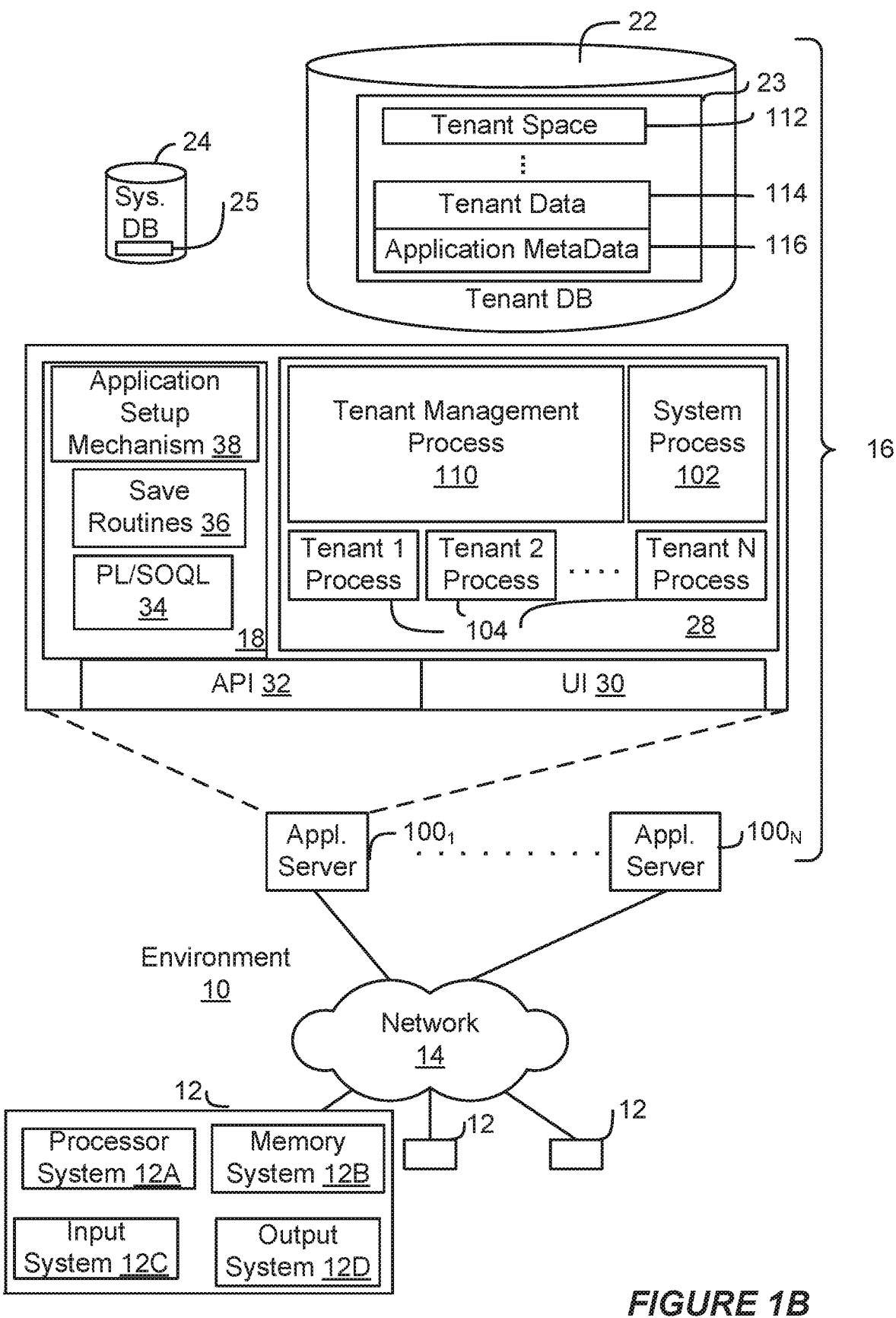
FIG. 1B shows a block diagram of example implementations of elements of FIG. 1A and example interconnections between these elements according to some implementations.

FIG. 1B shows a block diagram of example implementations of elements of FIG. 1A and example interconnections between these elements according to some implementations. That is, FIG. 1B also illustrates environment 10, but FIG. 1B, various elements of the system 16 and various interconnections between such elements are shown with more specificity according to some more specific implementations. Additionally, in FIG. 1B, the user system 12 includes a processor system 12A, a memory system 12B, an input system 12C, and an output system 12D. The processor system 12A can include any suitable combination of one or more processors. The memory system 12B can include any suitable combination of one or more memory devices. The input system 12C can include any suitable combination of input devices, such as one or more touchscreen interfaces, keyboards, mice, trackballs, scanners, cameras, or interfaces to networks. The output system 12D can include any suitable combination of output devices, such as one or more display devices, printers, or interfaces to networks.

In FIG. 1B, the network interface 20 is implemented as a set of HTTP application servers $\mathbf{100}_1$-$\mathbf{100}_N$. Each application server 100, also referred to herein as an "app server", is configured to communicate with tenant database 22 and the tenant data 23 therein, as well as system database 24 and the system data 25 therein, to serve requests received from the user systems 12. The tenant data 23 can be divided into individual tenant storage spaces 112, which can be physically or logically arranged or divided. Within each tenant storage space 112, user storage 114 and application metadata 116 can similarly be allocated for each user. For example, a copy of a user's most recently used (MRU) items can be stored to user storage 114. Similarly, a copy of MRU items for an entire organization that is a tenant can be stored to tenant storage space 112.

The process space 28 includes system process space 102, individual tenant process spaces 104 and a tenant management process space 110. The application platform 18 includes an application setup mechanism 38 that supports application developers' creation and management of applications. Such applications and others can be saved as metadata into tenant database 22 by save routines 36 for execution by subscribers as one or more tenant process spaces 104 managed by tenant management process 110, for example. Invocations to such applications can be coded using PL/SOQL 34, which provides a programming language style interface extension to API 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications can be detected by one or more system processes, which manage retrieving application metadata 116 for the subscriber making the invocation and executing the metadata as an application in a virtual machine.

The system 16 of FIG. 1B also includes a user interface (UI) 30 and an application programming interface (API) 32 to system 16 resident processes to users or developers at user systems 12. In some other implementations, the environment 10 may not have the same elements as those listed above or may have other elements instead of, or in addition to, those listed above.

Each application server 100 can be communicably coupled with tenant database 22 and system database 24, for example, having access to tenant data 23 and system data 25, respectively, via a different network connection. For example, one application server $\mathbf{100}_1$ can be coupled via the network 14 (for example, the Internet), another application server $\mathbf{100}_{N-1}$ can be coupled via a direct network link, and another application server $\mathbf{100}_N$ can be coupled by yet a different network connection. Transfer Control Protocol and Internet Protocol (TCP/IP) are examples of typical protocols that can be used for communicating between application servers 100 and the system 16. However, it will be apparent to one skilled in the art that other transport protocols can be used to optimize the system 16 depending on the network interconnections used.

In some implementations, each application server 100 is configured to handle requests for any user associated with any organization that is a tenant of the system 16. Because it can be desirable to be able to add and remove application servers 100 from the server pool at any time and for various reasons, in some implementations there is no server affinity for a user or organization to a specific application server 100. In some such implementations, an interface system implementing a load balancing function (for example, an F5 Big-IP load balancer) is communicably coupled between the application servers 100 and the user systems 12 to distribute requests to the application servers 100. In one implementation, the load balancer uses a least-connections algorithm to route user requests to the application servers 100. Other examples of load balancing algorithms, such as round robin and observed-response-time, also can be used. For example, in some instances, three consecutive requests from the same user could hit three different application servers 100, and three requests from different users could hit the same application server 100. In this manner, by way of example, system 16 can be a multi-tenant system in which system 16 handles storage of, and access to, different objects, data and applications across disparate users and organizations.

In one example storage use case, one tenant can be a company that employs a sales force where each salesperson uses system 16 to manage aspects of their sales. A user can maintain contact data, leads data, customer follow-up data, performance data, goals and progress data, etc., all applicable to that user's personal sales process (for example, in tenant database 22). In an example of a MTS arrangement, because all of the data and the applications to access, view, modify, report, transmit, calculate, etc., can be maintained and accessed by a user system 12 having little more than network access, the user can manage his or her sales efforts and cycles from any of many different user systems. For example, when a salesperson is visiting a customer and the customer has Internet access in their lobby, the salesperson can obtain critical updates regarding that customer while waiting for the customer to arrive in the lobby.

While each user's data can be stored separately from other users' data regardless of the employers of each user, some data can be organization-wide data shared or accessible by several users or all of the users for a given organization that is a tenant. Thus, there can be some data structures managed by system 16 that are allocated at the tenant level while other data structures can be managed at the user level. Because an MTS can support multiple tenants including possible competitors, the MTS can have security protocols that keep data, applications, and application use separate. Also, because many tenants may opt for access to an MTS rather than maintain their own system, redundancy, up-time, and backup are additional functions that can be implemented in the MTS. In addition to user-specific data and tenant-specific data, the system 16 also can maintain system level data usable by multiple tenants or other data. Such system level data can include industry reports, news, postings, and the like that are sharable among tenants.

In some implementations, the user systems 12 (which also can be client systems) communicate with the application servers 100 to request and update system-level and tenant-level data from the system 16. Such requests and updates can involve sending one or more queries to tenant database 22 or system database 24. The system 16 (for example, an application server 100 in the system 16) can automatically generate one or more SQL statements (for example, one or more SQL queries) designed to access the desired information. System database 24 can generate query plans to access the requested data from the database. The term "query plan" generally refers to one or more operations used to access information in a database system.

Each database can generally be viewed as a collection of objects, such as a set of logical tables, containing data fitted into predefined or customizable categories. A "table" is one representation of a data object, and may be used herein to simplify the conceptual description of objects and custom objects according to some implementations. It should be understood that "table" and "object" may be used. interchangeably herein. Each table generally contains one or more data categories logically arranged as columns or fields in a viewable schema. Each row or element of a table can contain an instance of data for each category defined by the fields. For example, a CRM database can include a table that describes a customer with fields for basic contact information such as name, address, phone number, fax number, etc. Another table can describe a purchase order, including fields for information such as customer, product, sale price, date, etc. In some MTS implementations, standard. entity tables can be provided for use by all tenants. For CRM database applications, such standard entities can include tables for case, account, contact, lead, and opportunity data objects, each containing pre-defined fields. As used herein, the term "entity" also may be used interchangeably with "object" and "table."

In some MTS implementations, tenants are allowed to create and store custom objects, or may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In some implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

II. Introduction for Memory Compact Model Associated with Multiple Feature Hash Map to Enable Feature Selection and Efficient Memory Usage With feature-hashing, a fixed size of memory may be utilized to store an unlimited number of features, with multiple features sharing a same hash code, therefore reusing the same model parameters. This looks like an incorrect solution: how random features that are bound by common hash code can reuse parameters? Well, in machine learning, not all features are equally likely to occur so the parameter favors the most frequent features; therefore feature-hashing is a practical solution for making tradeoff between memory and accuracy.

There are at least two different directions for improving a model: one is feature selection that selects relevant feature subsets from full feature sets for a robust, accurate model; the other is to reduce the number of features in the model by making multiple features reusing same model parameters. Unfortunately, those two directions at first glance appear to be irreconcilable. To understand why these directions appear at first glance to be irreconcilable, let us walkthrough a simple example.

Example

First, let us make sure we have necessary background well explained. We now use a toy example to show how a machine model works on bag-of-words features for a spam classifier.

In this example we have a simple spam classifier that has only four features as input: "present", "sex", "urgent" and "thanks". And this classifier will ignore any other words that are not in the above four words.

An input passage needs classifying into either spam or non-spam. An example input passage is: "Urgent need software developer! High salary!"

The input passage may be tokenized into a bag of words: {"urgent", "need", "software", "developer", "high", "salary"}

Given that the model only accepts "present", "sex", "urgent" and "thanks" as eligible features, a reduced bag of words (only one entry in this particular example) that is effective to the model is: {"urgent"}

The model may store weight for each word and do a linear combination of input bag of words with weights. An example of the weights applied to the words of the bag of words is: {present:−0.01, sex:0.3, urgent:0.1, thanks:−0.15}.

A final score may be computed using the following equation: Weight(urgent) *ExistOrNot(urgent)+Weight(present)*ExistOrNot(present)+Weight(sex) *ExistOrNot(sex)+Weight(thanks)*ExistOrNot(thanks)=0.1*1+ (−0.01) *0+0.3*0+(−0.15)*0=0.1

This example demonstrates the challenges of unifying feature selection using feature hashing.

Consider a hypothetical case to improve a model that is based on bag-of-words techniques by doing feature selections. In the hypothetical case a bag-of-words model for the example is:

{present:−0.01, sex:0.3, urgent:0.1, thanks:−0.15}

Where each word represents a unique feature, with a model parameter associated to that feature).

Intuitively, "sex" and "urgent" contribute positively to spam score, whereas "present" and "thanks" contribute negatively; since the weight for the feature "sex" is 3 times higher than the feature "urgent", the presence of the feature "sex" would contribute 3 times than the presence of the feature "urgent" in the spam score.

By establishing a criteria that "feature weights with absolute value less than 0.02 should be excluded from model", we identify that the feature "present" meets this criteria because its weight is −0.01. Therefore, the feature "present" may be removed from the model. Retraining the model based on the remaining features, results in the following model: {sex:0.32, urgent:0.11, thanks:−0.12}.

Note that in practice there may be other ways for selecting features. In some examples, feature weights and/or feature coverage (the frequency of features occurring in datasets) may be used as criteria for excluding low coverage features that may not contribute a lot but occupy memory for storing their weights.

By measuring the model performance, this model may be shown to perform more accurately than the previous model, because it removed the irrelevant feature "present" (so that the training set can be better utilized to improve accuracy). If the irrelevant feature "present" were not removed, a lot more training data may be needed to get the same accuracy (because additional data is needed to overcome the noises introduced by the irrelevant feature). On the other hand, with fewer features the model size is more compact (in this case we improve model size from 4 entries down to 3 entries).

Applying feature-hashing for the example, the following hash table may maps words to hashcode:
"Present", "thanks"=>01
"sex", "urgent"=>00

The model may be based on on the bag-of "hash code" rather than bag-of-words. The model may store weights on the hash code level rather than on the individual word level. An example of weights on the hash code level is: {"01": −0.1, "00": 0.2}

From this model, the feature "sex" contributes positively to the spam score because this feature maps to a hash code "00", which has the positive weight 0.2. The feature "urgent" contributes negatively to the spam score. This model still would work like for a spam classifier; and with less memory because only two entries in the model, versus originally four entries.

However, there is a complication to exclude an irrelevant feature such as "present" from the model because the feature "present" shares the same hash code with the feature "thanks", and the shared weight does not indicate "present" is an irrelevant feature (the absolute value of −0.1 is 0.1, higher than the threshold 0.05). Whenever the feature "present" feature occurs, a weight of −0.1 rather than the −0.01— its true weight—will be used, which may cause incorrect scoring. A possible solution is to remove the hash code "01" from the model in order to mitigate the "present" influence to the model for scenarios where "present" occurs in input, but this would remove the feature "thanks" as well, impacting the accuracies for input where "thanks" occurs.

Another possible solution is to perform feature selection and feature-hashing is to remove the "present" feature before mapping the features into hash codes. For instance, the feature "present" may be pre-removed (so no hash code collisions with "thanks" occur). However, this possible solution introduces another lookup table for checking whether to filter the feature "present" preceding mapping features to hash codes. In this example, such a data structure is: {present:1}. However, in Natural Language Processing (NLP) applications where many words are irrelevant features, such a lookup table will grow very large in practice, which may defeat the purpose of doing feature-hashing which aimed at saving memory

III. Memory Compact Model Associated with Multiple Feature Hash Map to Enable Feature Selection and Efficient Memory Usage Our goal is to consolidate feature selection to provide a memory compact model that uses a feature-hashing technique referring to herein as "Feature IdHash" so that feature selection may be done to remove irrelevant features for robust and accurate model, and at the same time it is compatible with feature-hashing to provide a compact, up-bounded memory cost for the model (without reliance of large lookup table preceding the model stage).

Example

To describe a memory compact model, the Feature Mash technique may be applied to the previously discussed example. Applying Feature IdHash, a hash table to map words to hashcode is:
"Present", "thanks"=>01
"sex", "urgent"=>00

While multiple features sharing the same model parameter (weight) saved memory, a unique identity of features may be lost on recovery. For example, with hash code "01", there are two possible words: "present" and "thanks". If we include hash code "01" into model, we include irrelevant feature "present". If we exclude hash code "01" from model, we lose a relevant feature "thanks".

This situation improves when we have another hash function mapping the original features into different code. And the mapping is statistically independent to the first hash function. For instance, a hash table based on a second hash function that is different than the first hash function is:
"Present"=>01
"Thanks", "sex", "urgent"=>10

To cause the model cord a random one (e.g., a selected subset) of the multiple original features that are mapped to the hash code, the model may be:
{"h1_01": thanks: −0.1, "h1_00": urgent: 0.2, "h2_01": Present: −0.01, "h2_10": sex: 0.1}
Where "h1_01" means hash code "01" from the first hash function; "h2_10" means hash code "10" from the second hash function.

Between the feature name and the weight, we may also record the random one feature name from multiple alternatives.

By adding another counterpart hash function and recording a subset of feature names (e.g., one random original feature name), we may increase the memory of the model by two plus times. However, if we further assume feature name has maximal length, then there is not a significant increase of memory cost because of upper bounded by a constant factor. Adding the counterpart hash function addresses the challenge on feature selection.

Removal of the Feature "Present" in the Example

Adding another hash code helps on feature selection. The feature "present" now has two hash code associated, one is "h1_01" and the other is "h2_01". In "h1_01" it shares the code with "thanks"; in "h2_01" it does not share with any other code.

The hash code "h2_01" has lowest relevancy because its absolute weight is just 0.01 (we assume 0.05 absolute weight is the filtering threshold). A lowest relevancy hash code may be considered for removal. With "h2_01" removed, the model is:
{"h1_01": thanks: −0.1, "h1_00": urgent: 0.2, "h2_10": sex: 0.1}

Selected feature sets (in original feature name) may be "thanks", "urgent" and "sex", and their corresponding hash codes are "h1_01", "h1_00" and "h2_10". Model training on this subset of features may improve accuracy.

Irrelevant Features Occurring in Multiple Hashcodes

Mapping one feature into multiple hash codes enables removal of one feature (e.g., a feature identified as irrelevant). However, each occurrence in the model may be removed, for instance:
{"h1_01": present: −0.1, "h1_00": urgent: 0.2, "h2_01": present: −0.01, "h2_10": sex: 0.1}

In general, if we decide to remove a feature name from the model, we can identify hash codes associated with that feature name in the model (we always know all hash codes of a feature name), and delete one of the identified hash codes with the smallest absolute weight. Such removal may safely remove the feature name from model because by removing at least one hash code for a feature, the model may not input such a feature.

The hash code "h1_01" Or may be associated by either "present" or "thanks". Therefore, sometimes we record this hash code's example feature name as "present" rather than "thanks". Accordingly, in addition of removing "h2_01", we also need to remove each occurrence of example feature of h2_01, replacing it with "ANY", leading to the following model:

{"h1_01": ANY: −0.1, "h1_00": urgent: 0.2, "h2_10": sex: 0.1}

In the above, "ANY" means any features that correspond to "h1_01" Or hash code can be taken as the model's features (e.g., affect the model's scoring). However, if there is a "present" word in the input, the model will not be affected because "h2_01" (the other hash code for "present") has been removed. Accordingly, we have a filter for useful features that may filter out features that are not in the selections using multiple hash codes for an input entry within one hash table. Therefore, feature filtering is applied to unifying feature selection and Feature Idhash in NLP machine learning context.

Removal of Other Feature(s) Associated with Removal of a Hash Code

Machine learning algorithm for training the model may ensure that highly relevant features may have high weights on all hash codes associated with that feature and the associated weights are close to one another (using L1/L2 regularization or multi-task learning, for example).

An inspection of the model (e.g., a manual inspection by a human) may identify some feature names that appear to be irrelevant features and should be removed, but their corresponding hash code's weights' deviations or differences may be high, indicating that there may be other important features sharing the same hash code, or they themselves may not be the one consistently bringing the associated hash codes' weight high and consistent. In that case, for a feature name identified manually, all associated hash codes for the candidate irrelevant feature may be identified (for instance, in an automated fashion, since all hash codes for any given feature are known) to remove one or ones of the hash code with the lowest absolute weight(s) (or set them to zero weights). If all the associated hash codes are high weight and close to one another, this may indicate that the manually identified feature cannot be removed without collaterally removing other important features. In that case, pre-filtering of the feature lists may be utilized.

Storing a Sample Feature Name for a Hash Code

In general, the following goals may be achieved by storing sample feature names for each hash code:
Enabling easy interpretation of the model
Although it is a random feature name for a hash code, it provides a lot hints on what features the model is sensitive to.
Enabling human aided feature selection, which may include:
Hand picking features (for removal) by feature names; and/or
Development of a filtration rule based on feature names for removal.

Adding this random original feature to each hash code in the model is enabled by multiple feature hashes. In contrast, if only a single feature hash is used, then for those features identified, e.g., visually identified, as irrelevant features, there may be no comparatively lowest relevant hash code to remove (so with a single feature hash there is no enabling of safe removal from the model if their solely-associated hash code's weights are high).

It is apparent that we may not store all the original features associated to hash codes with one random pick. Otherwise, the original purpose for the memory efficient model may be defeated. However, even with partial original features revealed, we can identify its related feature names that share the same suffixes, prefixes, or some regex patterns, and their associated hash codes and weights. This provides important diagnostic information regarding to how well the model learns on the training set and whether the model over fits.

Figure 2:
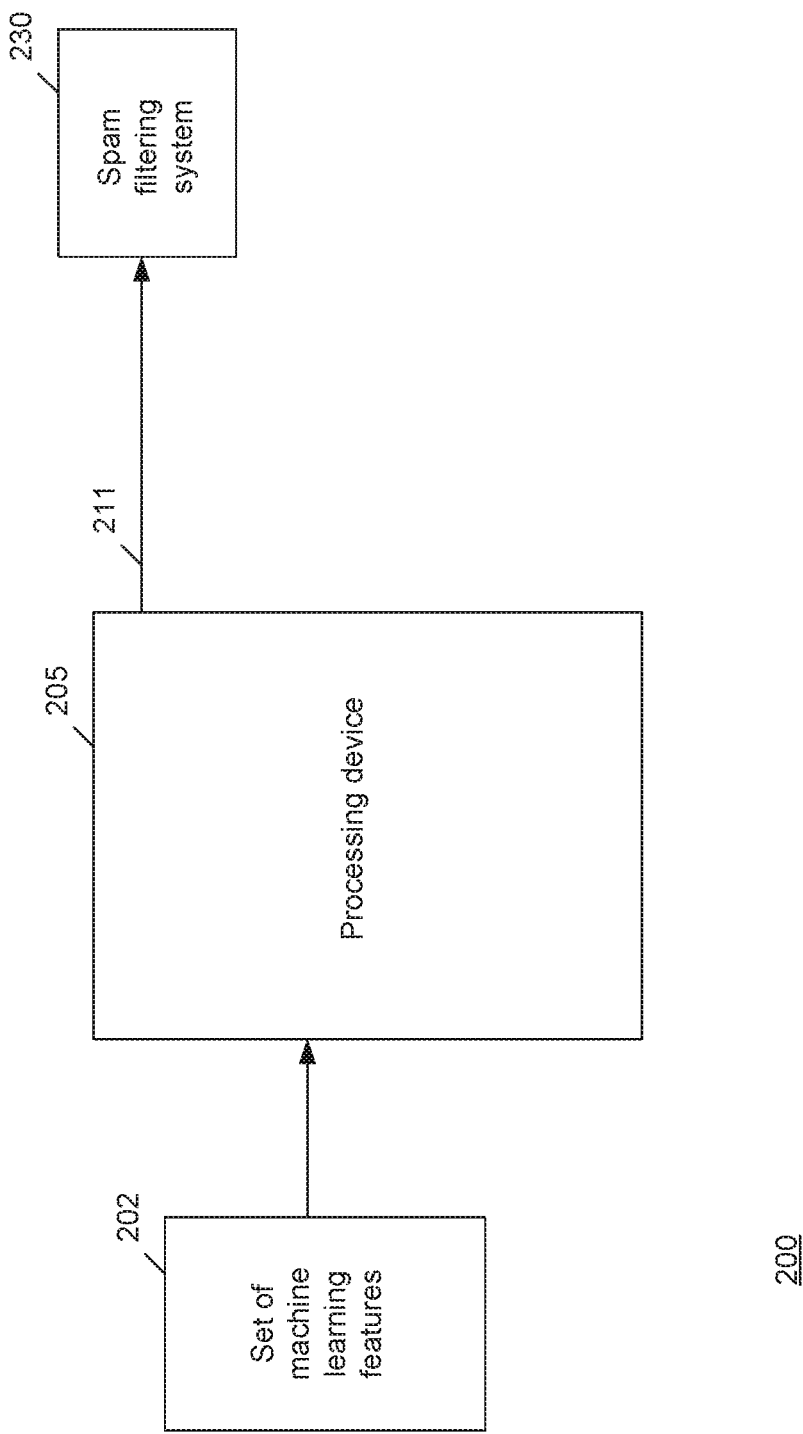
FIG. 2 illustrates a system utilizing multiple feature hash map to enable feature selection and efficient memory usage.

FIG. 2 illustrates a system 200 utilizing multiple feature hash map to enable feature selection and efficient memory usage. The system 200 may include a processing device 205, which may be a component of an online machine learning system that corresponds to any number of the application servers 100 of FIGS. 1A-B. In some examples, the system 200 may include a spam filtering system 230 to receive an output 211 of the processing device 205 and classify a document or a portion thereof (such as a text passage) based on the output 211.

The processing 205 may be configured to identify a set of machine learning features 202. The processing device 205 may be configured to generate a first hash map of the set of machine learning features 202, and generate a second hash map of the set of machine learning features 202 using any of the techniques described herein. The second hash map may be different than the first hash map.

In some examples, the processing device 205 may be configured to concatenate the first and second hash maps to generate the model. In some examples, a concatenation utilized for the model includes a portion (e.g., only a subset) of a group of hash codes of the first hash map and/or a portion (e.g., only a subset) of a group of hash codes of the second hash map.

In one of the first and second hash maps, each feature of a subset of the set of machine learning features 202 may map to a same first hash code. In the other of the first and second hash maps, only a subset of this subset may map to a second different hash code. In some examples, in the other of the first and second hash maps, one of the features of the subset of the set of machine learning features 202 may map to a second different hash code than another feature of this subset.

In some examples, generating the model includes assigning weights to a selected feature for each hash code of the hash maps. In some examples, for each multiple feature hash code the selected feature the assigned weight corresponds to only a subset of features of said multiple feature hash code.

In some examples utilizing hash code removal, the processing device 205 may be configured to select a hash code of the hash codes of the generated first and second hash maps for removal. The selection may be after displaying of the hash codes and responsive to receipt of a user input that includes a hash code indicator. The selection may be based on at least one of feature names or weights assigned to features of the set of machine learning features 202. The model may be generated responsive to the selection of the hash code for removal.

In some examples, the processing device 205 is configured to select a feature name of the feature set for exclusion in generation of the model. As before, the selection may be based on a user input. The processing device 205 may identify hash codes of the first and second hash maps associated with the selected feature name, and select at least one of the identified hash codes for removal. In some examples, the selection of the at least one of the identified hash codes for removal is after a displaying of the identified hash codes and response to receipt of a user input that includes a value corresponding to one of the hash codes (e.g., a hash code indicator). The processing device 205 may be configured to generate the model responsive to a selection of the at least one of the identified hash codes for removal.

Figure 3:
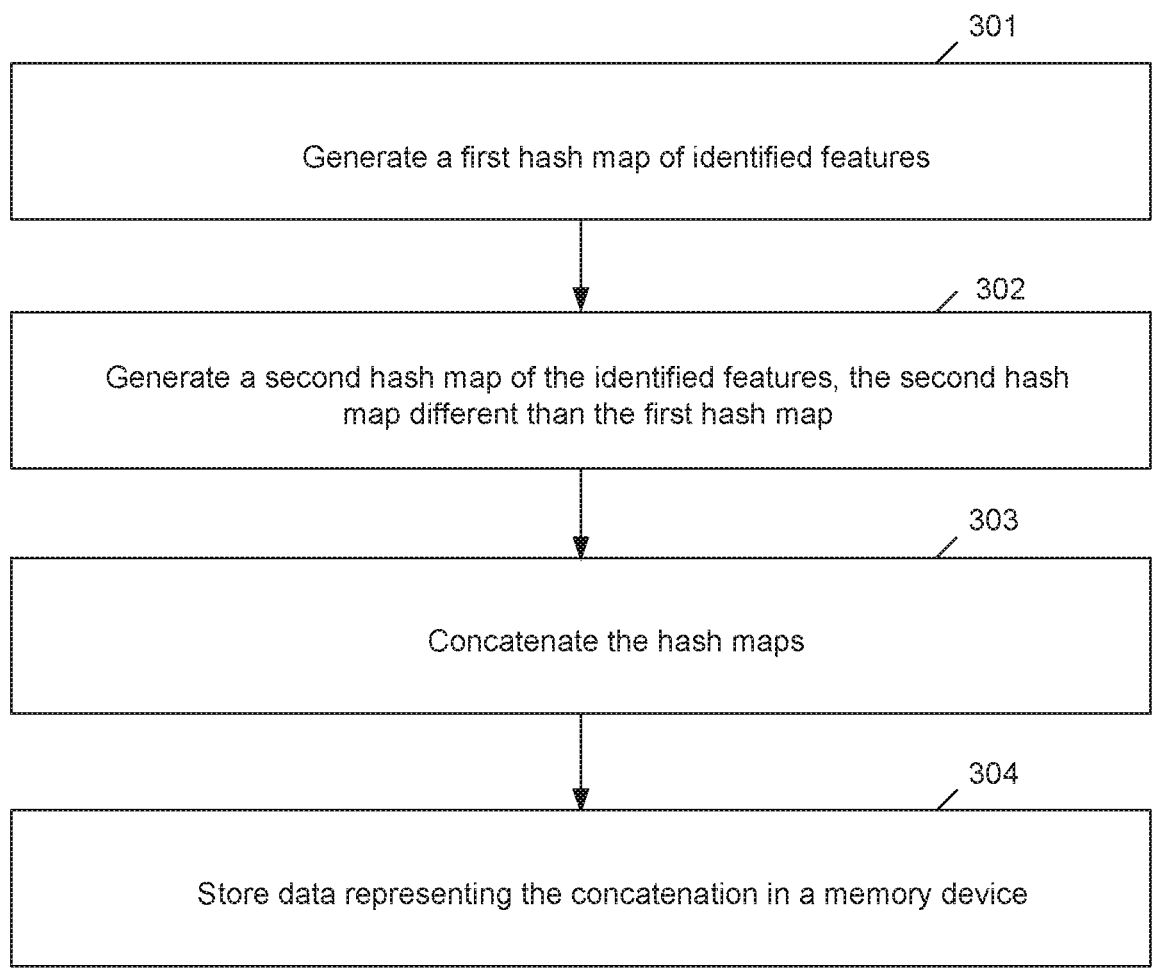
FIG. 3 illustrates a process that may be performed by the processing device of FIG. 2.

FIG. 3 illustrates a process 300 that may be performed by the processing device 205 of FIG. 2. In block 301, the processing device 205 may generate a first hash map of identified features. The processing device 205 may identify a set of machine learning features, and the identified features may be of this set).

In block 302, the processing device 205 may generate a second hash map of the identified feature. The second hash map may be different than the first hash map. The generation of the hash maps may include applying more than one hashing function to names of the identified features.

In block 303, the processing device 205 may concatenate the hash maps. In block 304, the processing device 205 may store a memory compact model or other data that represents a result of the concatenation in a memory device.

The processing device 205 or a processing device for a different electronic device may input a result of the concatenation into an online machine learning system. The processing device 205 or a processing device for a different electronic device may train a spam filtering system utilizing an output of the online machine learning system.

Figure 4:
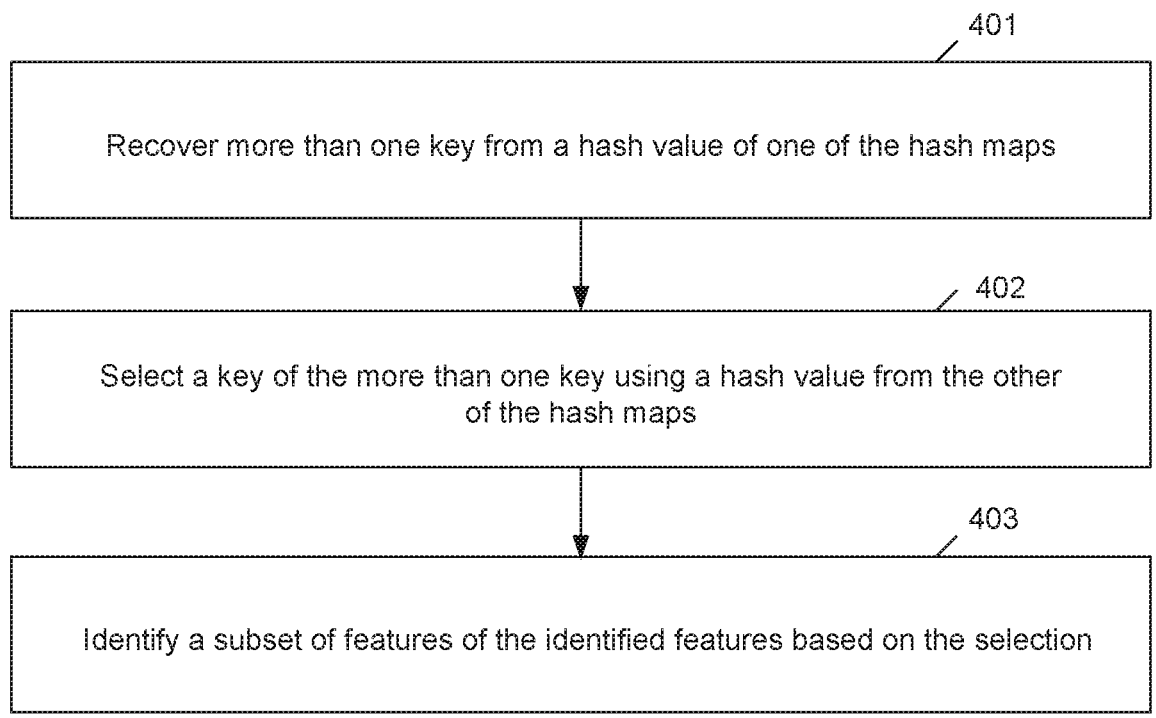
FIG. 4 illustrates a process that may be performed by the processing device of FIG. 2 subsequent to performing all or part of the process of FIG. 3.

FIG. 4 illustrates a process 400 that may be performed by the processing device 205 of FIG. 2 subsequent to performing all or part of the process 300. In block 401, the processing device 205 may recover more than one key from a hash value of one of the hash maps. There are multiple hash maps originating from same key sets. As such, by extracting one key from a hash value of one of the hash maps, we may multiple keys e.g., recovering more than one key).

In block 402, the processing device 205 may select a key of the more than one key using a hash value from the other of the hash maps. In the case of multiple keys, the processing device 205 may select a key of the multiple keys based on checking values from the other of the hash maps (to identify whether it is the key "to be selected", or not). In block 403, the processing device 205 may identify a subset of the identified features based on the selection.

The specific details of the specific aspects of implementations disclosed herein may be combined in any suitable manner without departing from the spirit and scope of the disclosed implementations. However, other implementations may be directed to specific implementations relating to each individual aspect, or specific combinations of these individual aspects.

Additionally, while the disclosed examples are often described herein with reference to an implementation in which an on-demand database service environment is implemented in a system having an application server providing a front end for an on-demand database service capable of supporting multiple tenants, the present implementations are not limited to multi-tenant databases or deployment on application servers. Implementations may be practiced using other database architectures, i.e., ORACLE®, DB2® by IBM and the like without departing from the scope of the implementations claimed.

It should also be understood that some of the disclosed implementations can be embodied in the form of various types of hardware, software, firmware, or combinations thereof, including in the form of control logic, and using such hardware or software in a modular or integrated manner. Other ways or methods are possible using hardware and a combination of hardware and software. Additionally, any of the software components or functions described in this application can be implemented as software code to be executed by one or more processors using any suitable computer language such as, for example, Java, C++ or Perl using, for example, existing or object-oriented techniques. The software code can be stored as a computer- or processor-executable instructions or commands on a physical non-transitory computer-readable medium. Examples of suitable media include random access memory (RAM), read only memory (ROM), magnetic media such as a hard-drive or a floppy disk, or an optical medium such as a compact disk (CD) or DVD (digital versatile disk), flash memory, and the like, or any combination of such storage or transmission devices.

Computer-readable media encoded with the software/program code may be packaged with a compatible device or provided separately from other devices (for example, via Internet download). Any such computer-readable medium may reside on or within a single computing device or an entire computer system, and may be among other computer-readable media within a system or network. A computer system, or other computing device, may include a monitor, printer, or other suitable display for providing any of the results mentioned herein to a user.

While some implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

What is claimed is:

1. A database system, comprising:
   a processing system; and
   a memory device coupled to the processing system and including instructions stored thereon that, in response to execution by the processing system, are operable to:
   identify a set of machine learning (ML) features;
   generate a first hash map of said set of ML features, the first hash map mapping first hash codes with corresponding ML features of the set of ML features;
   generate a second hash map of said set of ML features, the second hash map being different than the first hash map, and the second hash map mapping second hash codes with corresponding ML features of the set of ML features;
   generate a model for an online ML system using the first and second hash maps, the model being based on a hash map including one or more first hash codes from the first hash map and one or more second hash codes from the second hash map and including at least two ML features in the set of ML features that map to a same first hash code, and wherein, to generate the model, the instructions are further operable to: replace one ML feature of the at least two ML features in the first hash map with a second hash code that maps to the one ML feature in the second hash map; and store the generated model in the memory device or another memory device.

2. The database system of claim 1, wherein generating the model includes assigning weights to a selected feature for each hash code of the hash maps.

3. The database system of claim 2, wherein, for each hash code that corresponds to multiple features, the assigned weight corresponds to only a subset of the multiple features.

4. The database system of claim 1, wherein the instructions are further operable to:
select a hash code of the hash codes of the generated first and second hash maps for removal;
wherein the model is generated responsive to the selection of the hash code for removal.

5. The database system of claim 4, wherein the selection is after a displaying of the hash codes and responsive to receipt of a user input that includes a hash code indicator.

6. The database system of claim 4, wherein the selection is based on at least one of feature names or weights assigned to the features.

7. The database system of claim 1, wherein the instructions are further operable to:
select a feature name of the set of ML features for exclusion in generation of the model;
identify hash codes of the first and second hash maps associated with the selected feature name;
select at least one of the identified hash codes for removal; and
generate the model responsive to a selection of the at least one of the identified hash codes for removal.

8. The database system of claim 7, wherein the selection of the at least one of the identified hash codes for removal is after a displaying of the identified hash codes and response to receipt of a user input that includes a hash code indicator.

9. The database system of claim 1, wherein the operations are further operable to concatenate the first and second hash maps to generate the model.

10. The database system of claim 9, wherein a concatenation utilized for the model includes at least one of only a subset of a group of hash codes of the first hash map or only a subset of a group of hash codes of the second hash map.

11. A database system, comprising:
a processing system; and
a memory device coupled to the processing system and including instructions stored thereon that, in response to execution by the processing system, are operable to:
identify a set of machine learning (ML) features;
generate a first hash map of said set of ML features, the first hash map mapping first hash codes with corresponding ML features of the set of ML features;
generate a second hash map of said set of ML features, wherein the second hash map is different than the first hash map and the second hash map mapping second hash codes with corresponding ML features of the set of ML features;
concatenate the first and second hash maps to generate a model for an online ML system, the model being based on a concatenated hash map that includes one or more first hash codes from the first hash map and one or more second hash codes from the second hash map, and including at least two ML features in the set of ML features map to a same first hash code, and wherein, to concatenate the first and second hash maps, the instructions are further operable to: replace each of the at least two ML features in the first hash map with each second hash code that maps to each of the at least two ML features in the second hash map; and
store the model in the memory device or another memory device.

12. The database system of claim 11, wherein the instructions are further operable to:
recover more than one key from a hash value of one of the hash maps;
select a key of the more than one keys using a hash value from the other of the hash maps; and
identify a subset of features of the set of ML features based on the selection.

13. The database system of claim 12, wherein the instructions are further operable to:
input a result of the concatenation into an online ML system.

14. The database system of claim 13, wherein the instructions are further operable to:
train a spam filtering system utilizing an output of the online ML system.

15. The database system of claim 12, wherein generate the hash maps includes apply a plurality of hashing functions to names of features of the set of ML features.

16. A method, comprising:
generating a first hash map of a set of machine learning (ML) features including a mapping of first hash codes to corresponding ML features of the set of ML fetures;
generating a second hash map of said set of ML features including a mapping of second hash codes to corresponding ML features of the set of ML fetures, the second hash map being different than the first hash map;
concatenating the first and second hash maps to produce a concatenated hash map, the concatenated hash map including one or more first hash codes from the first hash map and one or more second hash codes from the second hash map and including at least two ML features in the set of ML features map to a same first hash code, and the concatenating the first and second hash maps comprises replacing each of the at least two ML features in the first hash map with each second hash code that maps to each of the at least two ML features in the second hash map;
generating an ML model for an online ML system using the concatenated hash map; and
storing the ML model in a memory device or another memory device.

17. The method of claim 16, further comprising:
recovering more than one key from a hash value of one of the hash maps;
selecting a key of the more than one keys using a hash value from the other of the hash maps; and
identifying a subset of features of the set of ML features based on the selection.

18. The method of claim 17, further comprising:
inputting a result of the concatenation into an online ML system.

19. The method of claim 18, further comprising:
training a spam filtering system utilizing an output of the online ML system.

* * * * *